Figure 8:
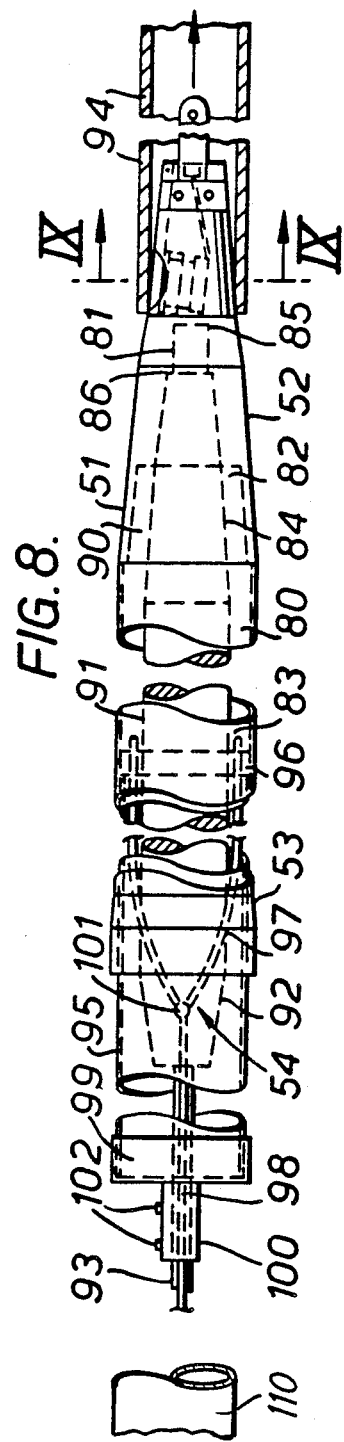

United States Patent [19]

Streatfield et al.

[11] Patent Number: 4,738,565

[45] Date of Patent: Apr. 19, 1988

[54] METHOD OF REPLACING MAINS

[75] Inventors: Roy Streatfield, Bilsborrow, Nr. Preston; Francis D. Wilson, Blackburn; Roger England, Clitheroe, all of England

[73] Assignee: British Gas Corporation, England

[21] Appl. No.: 892,321

[22] Filed: Aug. 4, 1986

Related U.S. Application Data

[63] Continuation of Ser. No. 726,292, Apr. 23, 1985, abandoned, which is a continuation of Ser. No. 525,807, Aug. 24, 1983, abandoned, which is a continuation of Ser. No. 326,138, Nov. 30, 1981, abandoned.

[30] Foreign Application Priority Data

Dec. 2, 1980 [GB] United Kingdom ............... 8038655

[51] Int. Cl.$^4$ .................... F16L 1/00; F16L 55/00
[52] U.S. Cl. .................... 405/154; 30/92.5; 83/178; 72/70; 72/71; 166/55.2; 138/97; 405/184
[58] Field of Search ............ 405/154, 156, 184; 166/55, 55.1, 55.2, 55.3; 83/178, 180, 188, 191, 186, 198; 30/92.5, 92, 90.9, 90.4, 103; 72/70, 71, 72; 254/29 R; 138/97; 15/104.07

[56] References Cited

U.S. PATENT DOCUMENTS

| | | | |
|---|---|---|---|
| 652,367 | 6/1900 | Law | 166/55.3 |
| 928,361 | 7/1909 | Cockburn | 15/104.07 |
| 1,001,205 | 8/1911 | Lovell | 166/55.2 |
| 1,519,882 | 12/1924 | Stewart et al. | 166/55.3 |
| 1,618,368 | 2/1927 | Dietle | 166/55.2 |
| 2,163,384 | 6/1939 | Stevens | 15/104.07 |
| 2,502,711 | 4/1950 | Evans | 30/92.5 |
| 2,638,165 | 5/1953 | Barber | 166/55.2 |
| 2,834,106 | 5/1958 | Conder | 30/92.5 |
| 2,947,253 | 8/1960 | Cirilo | 166/55.2 X |
| 2,983,042 | 5/1961 | Frantz et al. | 30/92.5 |
| 3,023,040 | 2/1962 | Cawley et al. | 166/55.2 X |
| 3,181,302 | 5/1965 | Lindsay | 405/156 |
| 4,003,122 | 1/1977 | Overmyer et al. | 405/45 X |
| 4,100,980 | 7/1978 | Jenne | 173/133 X |
| 4,118,940 | 10/1978 | Beane | 405/45 X |

FOREIGN PATENT DOCUMENTS

| | | | |
|---|---|---|---|
| 0094694 | 11/1983 | European Pat. Off. | 138/97 |
| 2475805 | 8/1981 | France | 30/92.5 |

Primary Examiner—Dennis L. Taylor
Attorney, Agent, or Firm—Larson and Taylor

[57] ABSTRACT

A method for replacing an existing buried pipe of a crackable, fracturable material. By the application of a local intense pressure, the pipe is cracked and fractured into irregular fragments which are spread outwardly to provide space for a new replacement tubular assembly which is moved into the space as the pipe is fractured and the fragments spread. At least a portion of the outward spreading of the fragments occurs under the action of the intense local pressure. An apparatus used to carry out the method may be pushed and/or pulled through the existing main, and the pushing force may be applied by percussive action.

49 Claims, 5 Drawing Sheets

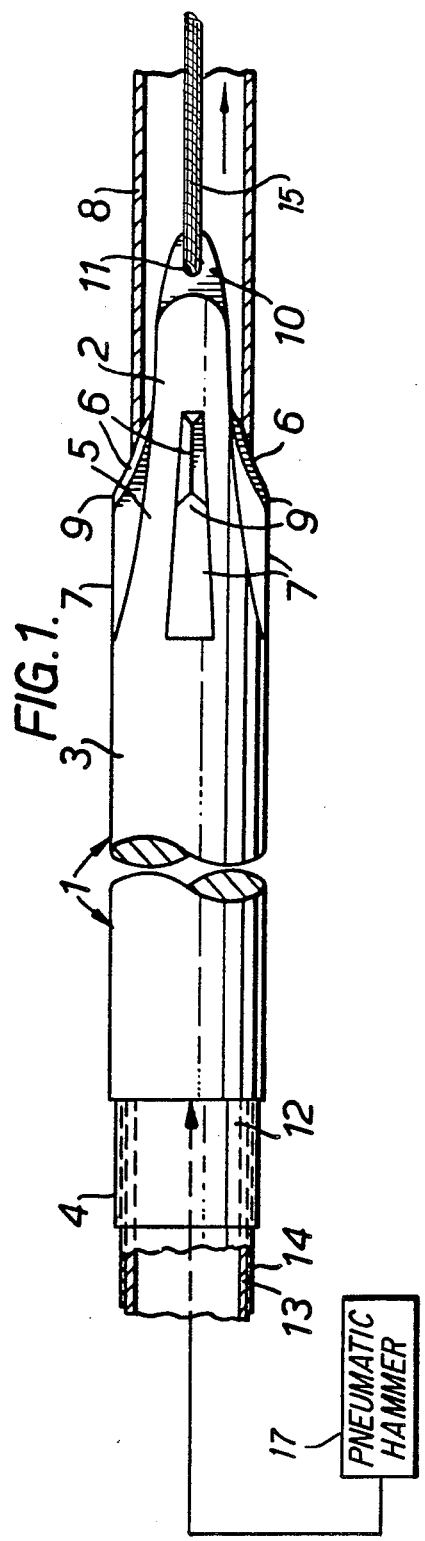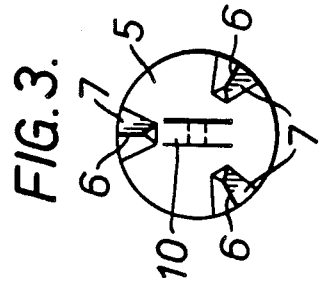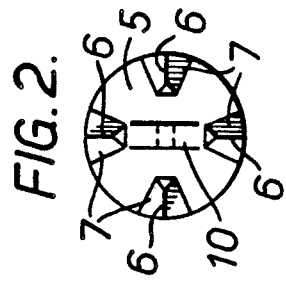

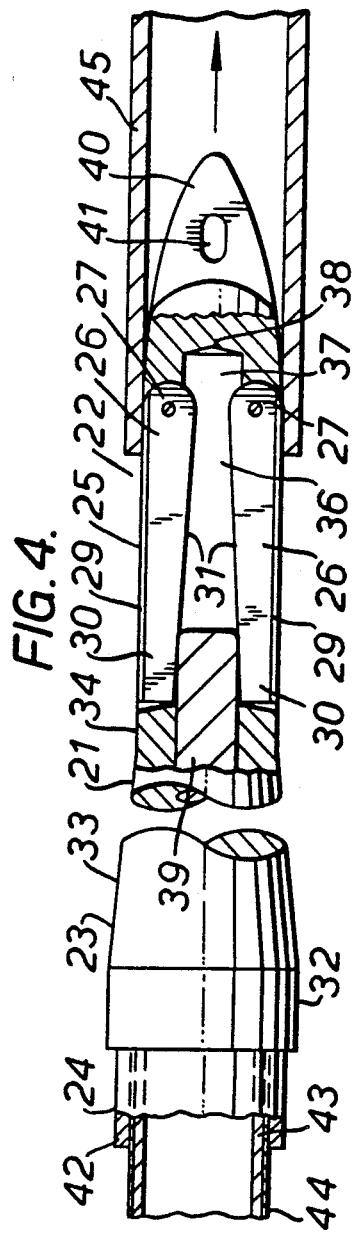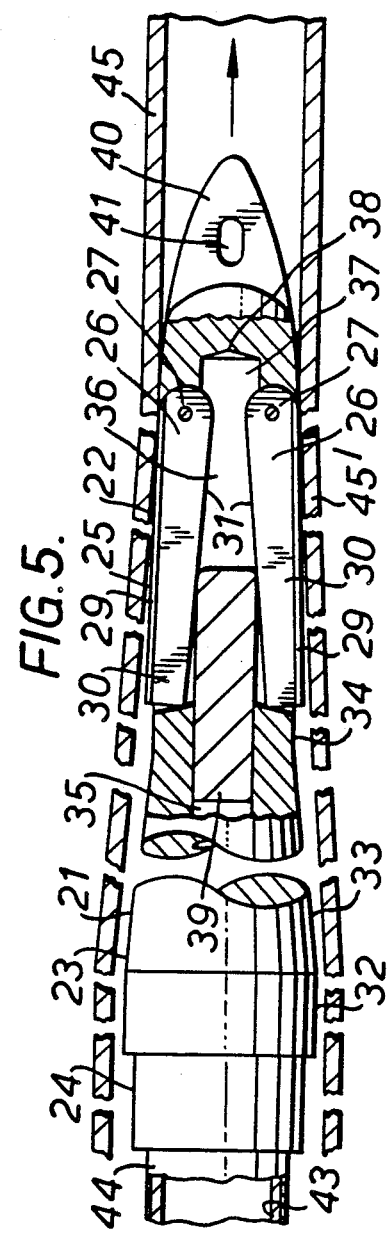

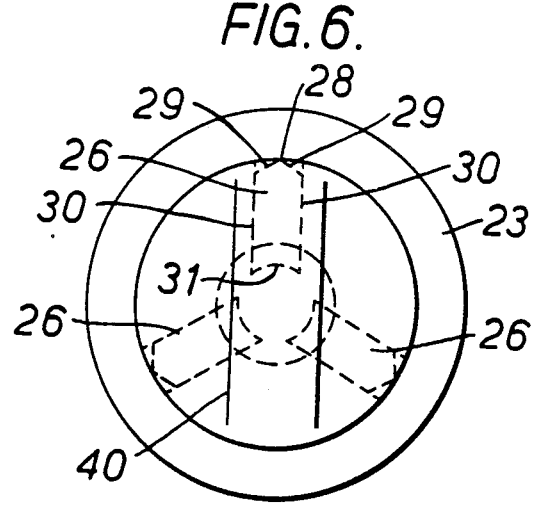
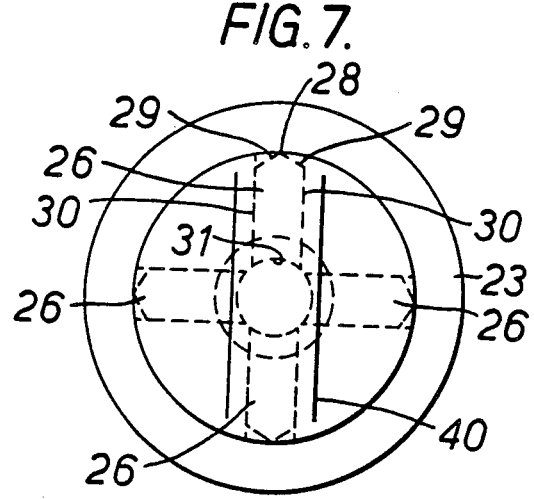

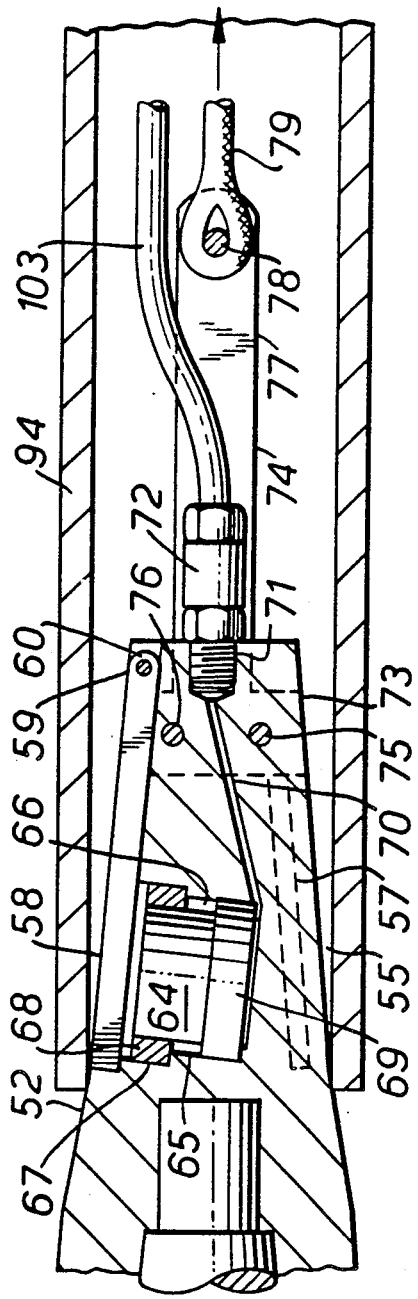

METHOD OF REPLACING MAINS

This application is a continuation of application Ser. No. 726,292, filed Apr. 23, 1985, now abandoned, which is in turn a continuation of Ser. No. 525,807, filed Aug. 24, 1983, now abandoned, which is in turn a continuation of Ser. No. 326,138, filed Nov. 30, 1981, now abandoned.

The present invention relates to the replacement or the preparation for replacement of an existing main, particularly an existing cast iron gas main, with a new main and is particularly concerned with a method and a device for enabling this replacement to be carried out.

Mains have to be replaced for a number of reasons, for instance, the existing main may be in poor condition or the existing main may not be of sufficient capacity to accomodate a modified load.

The usual means of replacing a gas main involves the use of costly and labour intensive total excavation of the surrounding ground. Alternatively, if total excavation is avoided and the new main is merely inserted into the existing main, it will, by necessity, be of smaller internal diameter than the existing main and thus will be of smaller gas carrying capacity.

It is an object of the present invention to enable an existing main to be replaced or prepared for replacement by a new main without any of the above disadvantages.

According to one aspect of the present invention, there is provided a method for replacing or preparing for replacement an existing main with a new main, the method comprising fracturing the existing main and maintaining sufficient clearance through the fractured main for movement therethrough of a new main or a liner for the fractured main, the liner to serve as a protective sleeve for the new main when the new main is subsequently moved into the liner.

In one embodiment of the invention the new main is presleeved with the liner before the new main is moved through the fractured main.

Suitably the existing main is continuously fractured ahead of the moving new main or liner.

Conveniently the internal diameter of the new main is equal to or greater than the internal diameter of the existing main.

Preferably the clearance provides a bore whose diameter is greater than the external diameter of the existing main.

Suitably the clearance provides a bore whose diameter is greater than the external diameter of the new main or the liner.

According to another aspect of the present invention a device is provided for replacing or preparing for replacement an existing main with a new main, the device comprising a mole for insertion into and movement along the existing main, the mole having a front portion provided with a fracturing face for engaging the internal wall of the existing main and arranged to cause the wall to fracture and a rear porion provided with means for clamping to the mole the new main or a liner for the existing main so that the mole tows the new main or the liner through the fractured main as the mole moves therethrough.

Preferably the front portion comprises a head portion provided with a fracturing face and a body portion of at least the same diameter as the largest diameter of the head portion.

Suitably the forward end of the mole is adapted for connection to a cable of a winch.

In one embodiment of the invention the fracturing face comprises edges on the head portion of the mole which edges are adapted to engage and fracture the wall of the existing main as the mole moves therethrough.

In this case the fracturing face preferably tapers radially inwardly in the direction of the front end of the mole.

The fracturing edges may comprise blades, at least one of which is movable radially outwardly from the mole to engage and fracture the wall of the existing main.

Preferably the fracturing edges lie in an axial plane of the mole.

Ideally the or each movable blade is pivotally mounted on the mole.

In this case movable means located within the mole may be provided to engage the movable blade or blades to cause the movable blade or blades to pivot.

In one embodiment of the invention, each blade is pivotally movable and the mole has an internal bore defined in part by portions of the blades and the movable means is located within the bore.

Preferably the movable means comprises an hydraulically actuated ram.

In another embodiment of the invention, only one blade is pivotally movable and the movable means comprises an hydraulically actuated piston.

In this case the mole may be provided with a duct for supplying hydraulic fluid to the piston, the duct extending into the mole from its forward end.

To impart movement to the mole, means are preferably located within the mole for driving the mole through the existing main.

Suitably the driving means comprises a pneumatically actuated hammer for engaging the mole to drive it percussively through the existing main.

Conveniently the hammer is located within a bore in the mole.

For convenience, either of the terms "fracturing surface" or "pipe fracturing portion" may be used to refer generally to the different forms of structures, including means fixed to the mole surface and means movable relative to the mole surface, which apply a local intense pressure to the main to cause it to crack and fracture into debris in the form of irregular fragments. The overall apparatus for carrying out the method may also be referred to as a pipe fracturing and replacement apparatus.

In accordance with the present method, the pipe fragments are spread outwardly generally about the axis of the existing pipe. The intense local pressure which causes the fracturing of the pipe also causes at least a portion of this outward movement of the fragments.

Embodiments of the invention will now be described with reference to the accompanying drawings in which:

FIG. 1 is a side view of a first embodiment of the mole shown in use,

FIG. 2 is an end view of the mole fracturing face shown in FIG. 1 and having four cutting edges, FIG. 3 is and end view of the mole fracturing face shown in FIG. 1 and having three fracturing edges, FIG. 4 is a side view partly in section of a second embodiment of the mole shown at the commencement of operation, FIG. 5 is a view of the mole shown in FIG. 4 during operation, FIG. 6 is an end view of the mole fracturing face shown in FIGS. 4 and 5 and having three fracturing elements shown in hidden detail and FIG. 7 is an end view of the mole fracturing face shown in FIGS. 4 and 5 and having four fracturing elements shown in hidden detail.

Figure 9:
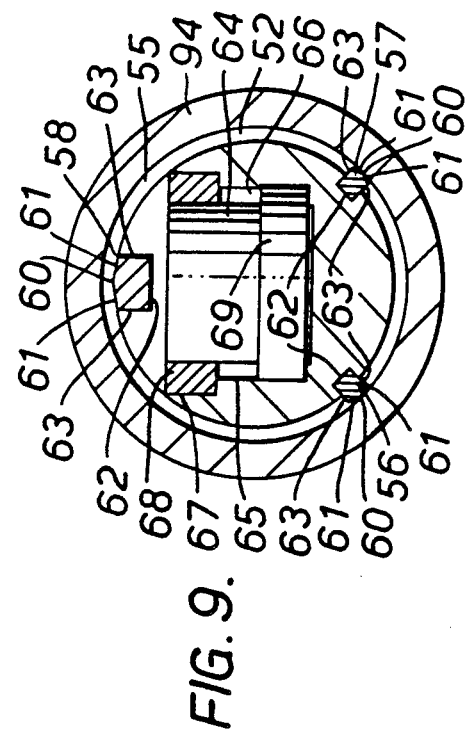

FIG. 8 is a side view of a third embodiment of the mole shown in use and broken away in part to reveal internal detail, FIG. 9 is a view along the lines IX—IX of FIG. 8 and FIG. 10 is a close up view of the front of the mole partly in section.

Referring to the FIGS. 1 to 3, FIG. 1 shows a steel mole 1 having a front portion consisting of a head portion 2 and a cylindrical body portion 3 and a rear portion having clamping means 4 for clamping a new main.

The head portion 2 has a fracturing face 5 comprising three or more fracturing edges 6 formed by grinding high tensile steel fracturing elements 7 (four cutters are shown in FIGS. 1 and 2). The fracturing elements 7 are housed in Keyways (not shown) in the head portion 2, which is in the form of a cylinder tapering towards the front end of the mole, the fracturing 7 being attached to the head portion 2 by means of bolts (not shown) so that the fracturing elements 7 are removable from the head portion 2. The fracturing face 5 tapers radially inwardly in the direction of the forward end of the mole 1, that is, the radii of the fracturing edges 6 decrease towards the forward end of the mole 1 so as to enable the fracturing face 5 to exert a continuously increasing fracturing action on the existing main 8 as the mole 1 moves therethrough.

The fracturing face 5 terminates at rearward points 9 on the head portion 2, which points 9 are concentrically aligned with the periphery of the body portion 3 and the keyways are arranged on the head portion 2 so that the fracturing elements 7 and their fracturing edges 6 in position on the mole 1 lie in an axial plane of the mole 1.

The front end of the head portion 2 is provided with a housing 10 cast into the head portion 2 and provided with an eye 11 to enable the mole 1 to be connected to a steel winch cable shown at 15 is FIG. 1 but omitted from FIGS. 2 and 3.

The rear portion of the mole 1 is provided with a clamping means 4 in the form of a sleeve 12 secured to the body portion 3 and being of slightly smaller external diameter than that of the body portion 3. The sleeve 12, in use, receives the end of the new main 13 which is of a flexible material such as plastics. The end of the new main 13 is first surrounded by a protective plastics sleeve 14 and the main 13 and sleeve 14 are pushed into the clamping sleeve 12. This is arranged to have an internal diameter approximately equal to the external diameter of the new main 13 so that this fits securely within and is tightly gripped and clamped by the clamping sleeve 12.

The cutters 7 are arranged to be spaced equiangularly around the axis of the cutting face 5 as shown in FIGS. 2 and 3 and the taper of the cutting face 5 prevents the mole 1 from twisting and turning on its horizontal axis thereby preventing undue strain on the new main and associated pneumatic feedlines (not shown).

In use, the ground at either end of the existing cast iron main 8 is excavated to expose those ends. The steel cable of a motorised winch is fed through the main 8 from one end and is secured to the shackle housing 10 via the eye 11. The new plastic main 13 and its sheath 14 are then clamped to the clamping sleeve 12. The new plastics main 13 can be of the same or slightly larger internal diameter than the existing cast iron main 8. The head portion 2 of the mole 1 is then inserted into the existing cast iron main 8 until the fracturing edges 6 engage the end of the main 8 as shown in FIG. 1.

The cable is then wound onto the winch so as to pull the mole 1 through the existing main 8. At the same time the rear portion 12 is acted upon by a pneumatic hammer shown schematically at 17 to drive the mole 1 percussively into the main 8. The combined tension and pneumatic pressure cause the mole 1 to move along the main 8 so that the fracturing edges 7 engage the internal wall of the main 8 and cause the wall to fracture due to their intense localised pressure on the wall as the mole 1 moves therethrough. The cylindrical body 3 widens out the internal diameter of the fractured main 8 since, in use, the body 3 is selected to have a diameter greater than that of the original internal diameter of the main 8. The body 3 also presents debris from the fractured main and earth from falling into the pathway created for the new main. As the mole 1 proceeds along the now fractured main 8 it tows the new main 13 and its associated sheath 14 with it, the internal diameter of the new main 13 being equal to or slightly larger than that of the existing main 8. When the new main 13 is finally in position, the new main 13 and its sheath 14 are removed from the clamping sleeve 12.

As a general rule the outer diameter of the body portion 3 of the mole 1 is arranged to be about ⅛" greater than the outer diameter of the existing main and the outer diameter of the clamping sleeve 12 is about ⅛" less in diameter than that of the cylindrical body portion 3 of the mole 1.

Referring to FIGS. 4 to 7, FIG. 4 shows a steel mole 21 having a front portion consisting of a head portion 22 and a body portion 23 and a rear portion having a clamping means 24 for clamping a new main.

The head portion 22 has a fracturing face 25 comprising three or more pivotally mounted fracturing blades 26 (four are present on the mole shown in FIGS. 4 and 5). The blades 26 are disposed in elongated axially directed slots (not shown) in the wall of the head portion 23 and are pivotally mounted at their forward ends 27 to the wall of the head portion 23.

Referring to FIGS. 6 and 7 the blades 26 are arranged to be spaced equiangularly around the axis of the cutting face. Each blade 26 has a fracturing edge 28 formed by two sloping sides 29, two parallel sides 30 adjoining the sloping sides 29 and a concave side 31 distal from the fracturing edge 28 between the parallel sides 30.

Referring to FIGS. 4 and 5 the concave side 31 slopes away from the fracturing edge 28 in a direction forwardly of the mole 1.

The body portion 23 has a cylindrical rear portion 32, a frustoconical portion 33 tapering forwardly of the mole and a cylindrical front portion 34 adjoining the slot forming walls (not shown) of the head portion 23.

The body portion 23 is provided with a circular centrally located through-going bore 35 (see FIG. 5) which merges with a passageway 36 formed by the concave sides 31 of the blades 26 and the internal concave shaped walls (not shown) of the head portion slot forming walls. The passageway 36 merges with a circular centrally located through-going bore 37 located near the forward end of the head portion 23 beyond the pivotted ends 27 of the blades 26. The bore 27 is provided with a conical termination 38.

The bore 35 and passageway 36 house an hydraulically operated cylindrical ram 39 which is capable of movement within the bore 35 and passageway 36. The front of the ram 39 is engaged at all times with the concave sides 31 of the blades 26. When the blades 26 are in the closed position shown in FIG. 4 the fracturing edges 28 are axially aligned with the front portion 34 of the body portion 23. The concave sides 31 of the blades 26 extend further radially into the passageway 36 than do the internal concave shaped walls of the head portion slot forming walls (not shown) so as to permit the blades 26 to pivot outwardly from the closed position in FIG. 4 to the open position in FIG. 5 as the ram 39 is moved forwardly along the passageway 36 and encounters the radially inward slope of the concave sides 31.

The front end of the head portion 22 is provided with a housing 40 and an eye 41 similar to that shown in the mole of FIG. 1 and for similar purposes.

The rear portion of mole 21 is provided with a clamping means 24 in the form of a clamping sleeve 42 similar to that shown in the mole in FIG. 1. As in that mole, the clamping sleeve 42 is secured to the body portion 23 and is of slightly smaller diameter than the rear portion 32 of the body portion 23. The new plastics main 43 and its protective sheath 44 are secured and clamped to the clamping sleeve 42 in exactly the same manner as previously described for the mole shown in FIG. 1.

In use, as with the mole described in FIG. 1, the ground at either end of the existing cast iron main 45 is excavated to expose those ends. The steel cable of a motorised winch is fed through the main 45 from one end and is secured to the housing 40 via the eye 41. The new plastics main 43 and its sheath 4 are then clamped to the clamping sleeve 42. The new plastics main 43 can be of the same or slightly larger internal diameter than the existing cast iron main 45. The head portion 22 of the mole 21 is then inserted into the existing main 45 until a portion at least of th fracturing blades 26 lie adjacent the internal wall of the existing main 45 as shown in FIG. 4. The ram 39 is actuated hydraulically to move forwardly within the passageway 36 to cause the blades 26 to pivot about their ends 27 to engage and fracture the cast iron main 45 by the intense localised pressure of their fracturing edges 28 upon the internal wall of the main 45 as shown in FIG. 5. After a portion of the main 45 has been cracked open the ram 39 is withdrawn to the position shown in FIG. 4 so that the blades 26 return to the closed position of FIG. 4. The winch cable (not shown) is then wound onto the winch so as to pull the mole 21 through the existing main 45 by an amount not exceeding the length of the blades 26. A next portion of the existing main 45 is then fractured by the method just described and the mole 21 is then pulled through the main 45 by a further amount not exceeding the length of blades 26. This process is repeated until the entire length of the existing main 45 has been fractured. As the mole 21 moves through the fractured main 45 the body portion 23 widens out the internal diameter of the fractured main 45 since, in use, the rear portion 32 of the body portion 23 is selected to have a diameter greater than that of the original internal diameter of the cast iron main 45.

The body portion 23 also prevents debris from the fractured main 45 and earth from falling into the pathway created for the new main 43. As the mole 21 proceeds along the fractured main 45, it tows the new main 43 with it, the internal diameter of the new main 43 being the same or slightly larger than that of the existing main 45. When the new main 43 is finally in position, the new main 43 and its sheath 44 are removed from the clamping sleeve 42.

Referring to FIG. 8, the steel mole 51 comprises a front portion consisting of a head 52 tapering generally conically towards its front end and a cylindrical rear portion 53 incorporating clamping means 54 for clamping a cylindrical liner for the new main.

As shown more clearly in FIGS. 9 and 10 the head portion 52 has a fracturing face 55 comprising three blades 56, 57 and 58 disposed in elongated axially directed slots in the wall of the head 52. Two lower blades 56 and 57 (shown in FIG. 9) are welded or bolted rigidly in the slots so that they are fixed.

The other upper blade 58, which is wider and thicker than the lower blades, is pivotally mounted at its forward end 59 to the wall of the head portion 52.

The upper blade 58 pivots on a pin 60 extending through portions (not shown) of the head 52 of the mole 51, the portions forming a recess (not shown) to accommodate movement of the forward end 59 of the blade 58.

As shown in FIG. 9, the blades 56 to 58 are spaced equiangularly around the axis of the fracturing face which tapers forwardly to the front end of the mole 51. Each blade 56 to 58 has a fracturing edge 60 formed by two sloping sides 61 and a base 62 distal from the fracturing edge 60 and formed between parallel sides 63.

Referring to FIGS. 9 and 10 the head 52 of the mole 51 houses an hydraulically actuated piston 64 slidable within a cylindrical bore 65 within the head 2. The bore 65 has a smaller diameter lower bore portion 66 communicating with a wider diameter upper bore portion 67. The wall of the bore portion 67 is screw threaded for receiving an externally threaded stop ring 68. The stop ring 68 serves to limit the extent of upward movement of the piston 64 when it engages with a lowermost stop collar 69 secured to the periphery of the piston 64.

As shown in FIGS. 8 and 10 the head 52 is provided with a hydraulic fluid channel 70 which at one end communicates with the bore 65 below the piston 64 and terminates in a threaded bore 71 of wider diameter at the front end of the head 52. The threaded bore 71 serves to receive the threaded connector of a hydraulic hose coupling 72.

While not shown, the front end of head 52 is recessed laterally on two sides to receive and engage the cross-pieces 73 of two adjacent T-shaped cable connecting plates 74 (only one plate 74 shown in the drawings). The plates 74 are connected to each other and to the front end of the head 52 by a pair of connecting pins 75 and 76 which extend through the cross-pieces 73 of the plates 74 via the front end of the head portion 52. The uprights 77 of the connecting plates 74 extend forwardly of the mole 51 and are connected together by a pin 78 which also forms a connecting point for the cable 79 of a winch (not shown).

Referring to FIG. 8, the rear 53 of the mole 51 comprises a generally hollow cylinder adjoining the conically tapering mole head 52. The mole 51 forms a housing for a pneumatically actuated hammer device 80.

The hammer 80 has head portion 81 projecting into an internal bore 82 formed in the head 52 of the mole 51, the rear 83 of the hammer 80 being axially disposed with clearance in the cylindrical rear portion 53 of the mole 51.

The head portion 81 of the hammer 80 comprises a forwardly conically tapering portion 84 terminating in a cylindrical end 85. The diameter of the end 85 is less than the diameter of the adjoining end of the conically tapering portion 84 so that there is an annular shoulder 85 formed between the portion 84 and the hammer end 85.

As shown in FIG. 8 the portion 84 and the end 85 of the hammer head 81 are, in use, able to cooperatively engage in corresponding portions of the internal bore 82, these portions also forming an annular shoulder for co-operation with the annular shoulder 86 in the hammer head 81. A rear part of the hammer head portion 84 is disposed axially with clearance in a wider forwardly conically tapering portion 90 of the internal bore 82, the portion 84 terminating within the rear 53 of the mole 51.

The rear 83 of the hammer 80 comprises a cylindrical portion 91 terminating in a rearwardly tapering conical portion 92 which is provided with a coupling (not shown) for an air hose 93.

In use, compressed air supplied to the hammer 80 through the hose 93 causes the hammer 80 to reciprocate in the conventional manner to drive the mole 51 through the existing main 94 by the percussive action of the hammer head 81 upon the corresponding co-operating portions of the internal bore 82 of the mole 51.

The means 54 for clamping the liner 95 to the mole 51 comprises a steel ring 96 for engaging the rear end of the liner 95, a looped cable 97 connected to the ring 96, a tensioning cable 98 connected to the cable 97, a clamping cup 99 for engaging the far end of the liner 95 and a locking device 100 for locking the cable 98 immovably against the cup 99.

The steel ring 96 is secured as by welding within and to the internal wall of the rear portion 53 of the mole 51. The ring 96 is formed with holes (not shown) to enable the ends of the looped steel cable 97 to be secured thereto.

The clamping cup 99 which is also of steel is adapted to receive and locate the far end of the liner 95 and is aperture (not shown) for the passage therethrough of the air hose 93 and of the tensioning cable 98.

The tensioning cable 98 which is also of steel, is coupled by a conventional hitch 101 at one end to the looped cable 97 and is connected via its other end to a winch (not shown).

The locking device 100 comprises a clamping block which has an axial bore therethrough for permitting the block to be slidable on the tensioning cable 98 and screws 102 for clamping the block to the cable 98.

In use of the mole 51, as with the moles previously described the ground at either end of the existing cast iron main 94 is excavated to expose the ends of the main 94. The steel cable 79 of a motorised winch is then fed through the main 94 from one end and is secured to mole 51 located at the other end of the main 103. The cable 79 is connected to the clamping plates 74 by way of the clamping pin 78. Next the hydraulic hose 103 is fed through the same end of the main 94 as the cable 79 and is coupled to the fluid bore 71 in the mole head 52 by way of the hose coupling 72.

In the next stage, the liner 95 is clamped to the mole 51. Initially, the looped cable 97 is secured to the ring 96 and the cable 97 is then secured to the tensioning cable 98 which has the clamp block 100. The liner 95 is then pushed up the cylindrical portion 53 of the mole 51 until one end of the liner 95 engages with the ring 96. The clamping cup 99 is then slid along the tensioning cable 98 and the air hose 93 until the other end of the liner 95 is located within and engages with the cup 99. The tensioning cable 98 is then tensioned by coiling it onto the winch and after the tension in the cable 98 is deemed to be sufficient, the clamping block 100 is slid along the cable 98 until it engages with the base of the cup 99 as shown in FIG. 8.

The screws 102 are then screwed into engagement with the tensioning cable 98 to clamp it securely against the clamping cup 99. The liner 95 is then clamped compressively between the clamping cup 99 and the ring 96. The tensioning cable 98 is now released from the winch.

As shown in FIGS. 8 and 10 the internal diameter of the liner 95 is greater than the internal diameter of the existing cast iron main 94.

The head portion 52 of the mole 51 is then inserted into the cast iron main 103 until the fracturing edges 60 of the blades 56, 57 and 58 engage the end of the main 103 as shown in the drawings. The pneumatic hammer 80 is actuated by supplying compressed air to its rear end by way of the air hose 93 so that the hammer 80 percussively drives the mole 51 through the main 94.

Simultaneously the mole 51 is drawn through the main 94 by the cable 79 which serves to guide the mole 51 axially through the main 94.

As the mole 51 moves through the main 103 the fracturing edges 60 engage the internal wall of the main 94 and cause it to fracture. Since the cylindrical portion 53 of the mole 51 has a greater external diameter than the internal diameter of the main 94, the internal diameter of the fractured main 94 is widened out. The body 53 of the mole 51 also serves to provide clearance for the passage of the liner 95 therethrough and prevents debris from the fractured main and earth from falling into the pathway created for the liner 95.

Should the mole 51 encounter an obstruction in the main 94, such as flange which narrows the internal diameter of the main 94, the movable blade 58 is pivotted outwardly to fracture the obstruction and provide a clearance for the liner. In this case hydraulic fluid is pumped to the piston 64 via the hose 103, duct 70 and the cylinder bore 65. The fluid pressure is relaxed immediately after the obstruction has been fractured so that the piston 64 relaxes and the blade 58 returns to its closed position. The hose 103 is of course moved simultaneously forward with the mole 51.

The linear 95 is pushed through and out of the main 103 after complete fracture thereof to expose the clamping cup 99 and block 100.

Finally the mole 51 together with the associated clamping means 53 are removed from the liner 95. The new main 110 may then be pushed manually or otherwise through the liner 95 which therefore forms a protective sleeve for the new main.

The new main may be of any convenient plastics material such as polyethylene or pvc while the liner is of a much tougher wear resistant plastics material.

We claim:

1. A method for replacing an existing main which is of a crackable, fracturable material with a tubular replacement assembly using a mole of the type having a front end which tapers radially inwardly towards the front of the mole and has a fracturing surface for cracking and fracturing engagement with the internal wall of the existing main and a rear end, the method comprising attaching to the rear end of the mole the tubular assembly, inserting the mole into the existing main with the front end of the mole leading and driving the mole percussively along the existing main so that the fracturing surface at the front end of the mole engages the internal wall of the existing main ahead of the tubular assembly with the said fracturing surface exerting an intense local pressure to crack and fracture the material of the existing main into irregular fragments, spreading the fragments outwardly generally about the axis of the mole to form a sufficient clearance through the fractured main for simultaneous movement of the tubular assembly therealong, at least a portion of the outward spreading of the fragments occurring under the action of the fracturing surface essentially concurrently with the fracturing of the existing main into such fragments.

2. A method as claimed in claim 1 in which the assembly is a tubular liner and the new main is subsequently moved into the liner.

3. A method as claimed in claim 1 in which the assembly comprises the new main.

4. A method as claimed in claim 1 in which the existing main is of cast iron.

5. A method as claimed in claim 1 in which the internal diameter of the tubular assembly is at least as great as the internal diameter of the existing main.

6. A method as claimed in claim 1 in which the clearance provides a bore, the diameter of which is greater than the external diameter of the existing main.

7. A method as claimed in claim 1 in which the clearance provides a bore, the diameter of which is greater than the external diameter of the tubular assembly.

8. A method as claimed in claim 1 in which the mole is also pulled through the existing main by means of a cable attached to the front portion of the mole.

9. A method for replacing an existing main which is of a crackable, fracturable material with a new main using a mole having a front end which tapers radially inwardly towards the front of the mole and has a fracturing surface for engagement with the internal wall of the existing main, said fracturing surface comprising blades on the front end radially openable and retractable in relation to the axis of the taper surface, the method comprising attaching to the rear end of the mole a tubular replacement assembly, inserting the mole into the existing main with the front end of the mole leading and moving the mole along the existing main so that the front end of the mole engages internally with the existing main and sequentially opening and retracting the blades to engage and fracture the wall of the existing main ahead of the assembly with the said blades exerting an intense local pressure to crack and fracture the material of the existing main into irregular fragments, spreading the fragments outwardly generally about the axis of the mole to form a sufficient clearance through the fractured main for movement of the assembly therealong, at least a portion of the outward spreading of the fragments occurring under the action of the blades essentially concurrently with the fracturing of the existing main into such fragments.

10. A method for replacing an existing main which is of a crackable, fracturable material with a new main using a mole having a front end which tapers radially inwardly towards the front of the mole and defines a fracturing surface for cracking and fracturing engagement with the internal wall of the existing main, said fracturing surface comprising blades on the front end radially openable and retractable in relation to the axis of the taper surface, the method comprising attaching to the rear end of the mole a tubular replacement assembly, inserting the mole into the existing main with the front end of the mole leading and moving the mole percussively along the existing main so that the front end of the mole engages internally with the existing main and sequentially opening and retracting the blades to engage and fracture the wall of the existing main ahead of the assembly with the said blades exerting an intense local pressure to crack and fracture the material of the existing main into irregular fragments, spreading the fragments outwardly generally about the axis of the mole to form a sufficient clearance through the fractured main for movement of the assembly therealong, at least a portion of the outward spreading of the fragments occurring under the action of the blades essentially concurrently with the fracturing of the existing main into such fragments.

11. A method as claimed in claim 9 in which the tubular assembly is a liner and the new main is subsequently moved into the liner.

12. A method as claimed in claim 10 in which the tubular assembly is a liner and the new main is subsequently moved into the liner.

13. A method as claimed in claim 9 in which the internal diameter of the new main is at least as great as the internal diameter of the existing main.

14. A method as claimed in claim 10 in which the internal diameter of the new main is at least as great as the internal diameter of the existing main.

15. A method as claimed in claim 9 in which the clearance provides a bore, the diameter of which is greater than the external diameter of the existing main.

16. A method as claimed in claim 10 in which the clearance provides a bore, the diameter of which is greater than the external diameter of the existing main.

17. A method as claimed in claim 9 in which the clearance provides a bore, the diameter of which is greater than the external diameter of the new main.

18. A method as claimed in claim 10 in which the clearance provides a bore, the diameter of which is greater than the external diameter of the new main.

19. A method according to claim 1 wherein the step of driving the mole percussively along the existing main comprises driving the mole with a pneumatically accuated hammer.

20. A method according to claim 19 wherein the step of driving the mole percussively along the existing main further comprises acting upon the rear of the mole.

21. The method of claim 1 wherein the step of driving the mole percussively along the existing main comprises acting upon an internal portion of the mole.

22. A method for replacing an existing main which is of a crackable, fracturable material with a tubular replacement assembly using a mole of the type having a front end which tapers radially inwardly towards the front of the mole and has a fracturing surface for cracking and fracturing engagement with the internal wall of the existing main and a rear end, the method comprising the steps of:

attaching the tubular assembly to the rear end of the mole, inserting the mole into the existing main with the front end of the mole leading, and forcing the mole along the existing main so that the fracturing surface at the front end of the mole engages the internal wall of the existing main ahead of the tubular assembly with the said fracturing surface exerting an intense local pressure to crack and fracture the material of the existing main into irregular fragments, spreading the fragments outwardly generally about the axis of the mole to form a into irregular fragments, spreading the fragments outwardly generally about the axis of the mole to form a sufficient clearance through the fractured main for simultaneous movement of the tubular assembly therealong, at least a portion of the outward spreading of the fragments occurring under the action of the fracturing surface essentially concurrently with the fracturing of the existing main into such fragments.

23. A method according to claim 22 wherein said forcing step constitutes pushing the mole from the rear.

24. A method according to claim 23 wherein said forcing step includes percussively pushing the mole from the rear.

25. A method according to claim 22 wherein said forcing step includes pulling the mole from the front.

26. A method according to claim 22 wherein said forcing step includes both pushing the mole from the rear and pulling the mole from the front.

27. A method of replacing a buried main which is of a crackable, fracturable material with a replacement main having an internal diameter that may exceed the internal diameter of the buried main comprising:

locating main fracturing and replacement apparatus in substantially axial registry with the centerline of the buried main to be replaced, said main fracturing and replacement apparatus having a main fracturing portion of generally conically tapering configuration and having a diameter at its leading extremity not greater than the internal diameter of said buried main and a diameter at its trailing extremity which is at least as great as the outer diameter of said replacement main, the main fracturing portion having a fracturing surface;

simultaneously moving said main fracturing portion through said buried main, so that its fracturing surface engages the main to be replaced with the said fracturing surface exerting an intense local pressure to crack and fracture the material of the buried main into debris in the form of irregular fragments and moving said debris of the fractured main radially outwardly into the surrounding earth formation generally about the axis of the main fracturing portion to form a replacement main passage of a dimension at least as great as the external dimension of the replacement main, at least a portion of the outward movement of the fragments occurring under the action of the fracturing surface essentially concurrently with the fracturing of the buried main into such fragments; and extending a replacement main into the passage simultaneously with passage of said pipe fracturing portion through said buried main.

28. A method of replacing a buried main which is of a crackable, fracturable material with a replacement main having an internal diameter equal to or greater than the internal diameter of the buried fracturable main comprising;

engaging said buried fracturable main in situ with an intense local pressure to crack and fracture it into the form of irregular fragments, moving said irregular fragments in a direction radially outwardly from the centerline of said buried fracturable main, generally about said centerline, into the earth within which said main is buried to form a replacement main passage of earth and fragments having a diameter at least as great as the outer diameter of said replacement main, at least a portion of the outward movement of the fragments occurring under the action of the said intense local pressure which causes the fracturing of the buried main into irregular fragments; and moving said replacement main endwise into said replacement main passage simultaneously with said fracturing of said buried fracturable main and said outward radial movement of said irregular fragments.

29. A method for replacing a buried existing main which is of a crackable fracturable material with a tubular replacement assembly, the method comprising engaging the buried main in situ with an intense local pressure to crack and fracture it into multiple irregular fragments, moving the irregular fragments in a direction radially outwardly from the axis of the buried main, generally about the said axis, to form a passage having a diameter at least as great as the external diameter of the tubular assembly, at least a portion of the outward movement of the fragments occurring under the action of the said intense local pressure which causes the fracturing of the buried existing main into irregular fragments, and moving the new assembly endwise into the passage simultaneously with the fracturing of the buried fracturable main and the outward radial movement of the fractured main.

30. A method as claimed in claim 29 in which the assembly is percussively driven through the buried main.

31. A method as claimed in claim 29 in which the passage is formed by a mole which is moved through the buried main and which has at least one retractably outwardly movable member to engage and fracture the internal wall of the buried main.

32. A method as claimed in claim 31 in which the mole has a plurality of members.

33. A method as claimed in claim 31 in which the tubular replacement assembly is connected to the rear end of the mole.

34. A method as claimed in claim 29 in which the internal diameter of the assembly is at least as great as the internal diameter of the buried main.

35. A method as claimed in claim 29 in which the internal diameter of the assembly is at least as great as the external diameter of the buried main.

36. A method as claimed in claim 29 in which the diameter of the passage is greater than the internal diameter of the buried main.

37. A method as claimed in claim 29 in which the diameter of the passage is at least as great as the external diameter of the buried main.

38. A method as claimed in claim 29 in which the buried main is of cast iron.

39. A method of replacing buried pipe of a crackable, fracturable material with replacement pipe having an internal diameter that may exceed the internal diameter of the existing buried pipe comprising:

(a) locating pipe fracturing and replacement apparatus in axial registry with the centerline of the pipe to be replaced, said pipe fracturing and replacement apparatus having a pipe fracturing portion of generally frustro-conical configuration and having a diameter at its leading extremity not greater than the internal diameter of said buried pipe and a diameter at its trailing extremity which is greater than the outer diameter of said replacement pipe, the pipe fracturing portion having a fracturing surface;

(b) simultaneously forcing said pipe fracturing portion through said buried pipe, applying an intense local pressure by means of the fracturing surface to reduce the pipe to be replaced to a fractured form having a multiple of pipe fragments of irregular form and forcing each of the pipe fragments of the fractured pipe radially outwardly into the surrounding earth formation generally about the axis of the pipe fracturing portion, thus forming a replacement pipe passage of a dimension at least as great as the external dimension of the replacement pipe, at least a portion of the outward movement of the fragments occurring under the action of the said intense local pressure which causes the fracturing of the pipe into irregular fragments; and (c) extending a replacement pipe into the passage simultaneously with passage of said pipe fracturing portion through said buried pipe.

40. A method as recited in claim 39, wherein; said method steps of paragraphs (b) and (c) are accomplished in a single pass with said pipe fracturing and replacement apparatus.

41. A method as recited in claim 39, wherein; said pipe fracturing portion is moved through said pipe by a pushing force.

42. A method as recited in claim 39, wherein; said pipe fracturing portion is moved through said pipe by a pulling force.

43. A method as recited in claim 39, wherein; said pipe fracturing portion is moved through said pipe by both pushing and pulling forces.

44. A method of replacing buried pipe of a crackable, fracturable material with a replacement pipe having an internal diameter equal to or greater than the internal diameter of the buried fracturable pipe, comprising;

(a) fracturing said buried fracturable pipe in situ with an intense local pressure to form a multitude of pipe fragments of irregular form;

(b) moving each of said pipe fragments in a direction radially outwardly of the centerline of said buried fracturable pipe, generally about the said centerline and embedding said multitude of pipe fragments into the soil within which said pipe is buried thus forming a replacement pipe passage of soil and pipe fragments having a common centerline with said buried fracturable pipe and a diameter at least as great as the outer diameter of said replacement pipe, at least a portion of the outward movement of the fragments occurring under the action of the said intense local pressure which causes the fracturing of the pipe into irregular fragments; and (c) moving said replacement pipe endwise into said replacement pipe passage simultaneously with said fracturing of said buried fracturable pipe and said radial movement of said multitude of pipe fragments.

45. A method for replacing an existing main with a new main, comprising the steps of;

starting with an existing main which is of a rigid material which cracks and is thus fracturable into irregular fragments, moving a tool through the existing main which engages the internal wall thereof as it moves through the main, to apply an intense local pressure to the existing main to crack and fracture it into irregular fragments as the tool moves therethrough, spreading the fragments outwardly generally about the axis of the tool to form a sufficient clearance through the fractured main for movement therethrough of an assembly for replacing the existing main, at least a portion of the outward movement of the fragments occurring under the action of the said intense local pressure which causes the fracturing of the existing main into irregular fragments.

46. A method according to claim 45, wherein the step of moving the tool through the existing main comprises driving the mole percussively.

47. A method according to claim 45, including attaching the assembly to the rear of the tool and moving the assembly along with the tool.

48. A method according to claim 45, wherein the moving step comprises acting upon the tool from its rear.

49. A method according to claim 45, wherein the moving step comprises pulling the tool.

* * * * *